US009996291B1

(12) United States Patent
Izhar et al.

(10) Patent No.: US 9,996,291 B1
(45) Date of Patent: Jun. 12, 2018

(54) STORAGE SYSTEM WITH SOLID-STATE STORAGE DEVICE HAVING ENHANCED WRITE BANDWIDTH OPERATING MODE

(71) Applicant: EMC Corporation, Hopkinton, MA (US)

(72) Inventors: Amnon Izhar, Brookline, MA (US); Patrick Weiler, Northborough, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 104 days.

(21) Appl. No.: 15/223,479

(22) Filed: Jul. 29, 2016

(51) Int. Cl.
*G06F 3/06* (2006.01)
*G06F 13/42* (2006.01)
*G06F 13/40* (2006.01)

(52) U.S. Cl.
CPC ............ *G06F 3/0625* (2013.01); *G06F 3/065* (2013.01); *G06F 3/0619* (2013.01); *G06F 3/0634* (2013.01); *G06F 3/0659* (2013.01); *G06F 3/0685* (2013.01); *G06F 13/4022* (2013.01); *G06F 13/4282* (2013.01)

(58) Field of Classification Search
None
See application file for complete search history.

(56) References Cited

U.S. PATENT DOCUMENTS 5,586,291 A * 12/1996 Lasker ................ G06F 11/1435
711/113

6,687,627 B1 * 2/2004 Gunn ................... G01R 21/133
324/500

(Continued)

FOREIGN PATENT DOCUMENTS

| CN | 104331339 A | * | 2/2015 |
| JP | 05072844 A | * | 3/1993 |
| JP | 2013082388 A | * | 5/2013 |

OTHER PUBLICATIONS

'ECA 190 Code Upgrade for DS8000's on R4.30 FHD Problem' Engineering Change Announcement, IBM, Sep. 10, 2016.*

(Continued)

*Primary Examiner* — Steven Snyder
(74) *Attorney, Agent, or Firm* — Ryan, Mason & Lewis, LLP

(57) ABSTRACT

A storage system in one embodiment comprises a host processor, a volatile memory associated with the host processor, and a solid-state storage device comprising a non-volatile memory. The host processor is configured to detect a particular power condition, such as a power failure condition, and responsive to the detected power condition to direct the copying of data from the volatile memory associated with the host processor to the non-volatile memory of the solid-state storage device. In conjunction with directing the copying of data from the volatile memory associated with the host processor to the non-volatile memory of the solid-state storage device, the host processor further directs the solid-state storage device to enter an enhanced write bandwidth operating mode in which the solid-state storage device temporarily at least partially suspends at least one specified background process that would otherwise tend to restrict an achievable write bandwidth of the solid-state storage device.

20 Claims, 2 Drawing Sheets

(56) References Cited

U.S. PATENT DOCUMENTS

| | | | | |
|---|---|---|---|---|
| 7,107,480 B1* | 9/2006 | Moshayedi | G06F 11/1441 | 714/2 |
| 8,195,901 B2* | 6/2012 | Harper | G06F 11/1441 | 711/103 |
| 8,296,498 B2* | 10/2012 | Gorobets | G06F 12/0246 | 711/103 |
| 8,327,069 B2* | 12/2012 | Moritoki | G06F 11/1666 | 711/118 |
| 8,429,436 B2* | 4/2013 | Fillingim | G11C 5/141 | 711/100 |
| 8,495,321 B2* | 7/2013 | Harper | G06F 11/1441 | 711/103 |
| 9,201,601 B2* | 12/2015 | Matsubara | G06F 3/0619 | |
| 9,274,865 B2* | 3/2016 | Furlong | G06F 12/0868 | |
| 9,342,423 B2* | 5/2016 | Judd | G06F 11/2284 | |
| 9,645,769 B2* | 5/2017 | Chadha | G11C 16/225 | |
| 9,804,796 B1* | 10/2017 | Gwin | G06F 3/0625 | |
| 2005/0117418 A1* | 6/2005 | Jewell | G06F 11/1441 | 365/202 |
| 2005/0193242 A1* | 9/2005 | Ash | G06F 11/1441 | 714/6.13 |
| 2008/0294814 A1* | 11/2008 | Gorobets | G11C 16/349 | 710/62 |
| 2010/0023672 A1* | 1/2010 | Gorobets | G06F 12/0246 | 711/103 |
| 2010/0180131 A1* | 7/2010 | Liu | G06F 1/305 | 713/300 |
| 2010/0199021 A1* | 8/2010 | Harper | G06F 11/1441 | 711/103 |
| 2010/0287217 A1* | 11/2010 | Borchers | G06F 12/0246 | 707/813 |
| 2011/0060927 A1* | 3/2011 | Fillingim | G11C 5/141 | 713/320 |
| 2012/0017033 A1* | 1/2012 | Moritoki | G06F 11/1441 | 711/103 |
| 2013/0254487 A1* | 9/2013 | Tanaka | H04L 49/552 | 711/123 |
| 2014/0115223 A1* | 4/2014 | Guddeti | G06F 13/404 | 710/314 |
| 2014/0215277 A1* | 7/2014 | Judd | G06F 11/2284 | 714/42 |
| 2014/0281127 A1* | 9/2014 | Marcu | G06F 12/0246 | 711/103 |
| 2014/0372829 A1* | 12/2014 | Park | G06F 11/1008 | 714/763 |
| 2015/0039824 A1* | 2/2015 | Furlong | G06F 12/0868 | 711/113 |
| 2015/0081946 A1* | 3/2015 | Lecocq | G06F 11/1441 | 711/102 |
| 2015/0248249 A1* | 9/2015 | Amidi | G06F 11/1441 | 711/103 |
| 2015/0293714 A1* | 10/2015 | Matsubara | G06F 3/0619 | 711/162 |
| 2016/0077930 A1* | 3/2016 | McKelvie | G06F 12/0246 | 714/19 |
| 2016/0118130 A1* | 4/2016 | Chadha | G11C 16/225 | 711/103 |
| 2017/0147363 A1* | 5/2017 | Sun | G06F 9/4406 | |
| 2017/0212700 A1* | 7/2017 | Lee | G06F 3/0619 | |

OTHER PUBLICATIONS

PCI-SIG, "Multicast," PCI Express Base Specification Version 2.0, May 8, 2008, 19 pages.

U.S. Appl. No. 15/198,404 filed in the name of S. Sardella et al. on Jun. 30, 2016 and entitled "Storage System with Data Durability Signaling for Directly-Addressable Storage Devices."

\* cited by examiner

US 9,996,291 B1

STORAGE SYSTEM WITH SOLID-STATE STORAGE DEVICE HAVING ENHANCED WRITE BANDWIDTH OPERATING MODE

FIELD

The field relates generally to information processing systems, and more particularly to storage in information processing systems.

BACKGROUND

Storage systems are often configured to include multiple storage tiers, with different ones of the tiers providing different levels of input-output (IO) performance or other characteristics. In such systems, data may be moved from one tier to another within a given storage system based on access frequency of the data or other factors. One or more of such storage tiers may comprise solid-state drives (SSDs) which are illustratively implemented using non-volatile memory such as flash memory.

SUMMARY

Illustrative embodiments of the present invention provide storage systems configured to implement an enhanced write bandwidth operating mode in one or more SSDs or other solid-state storage devices that include non-volatile memory. The enhanced bandwidth operating mode is illustratively initiated responsive to detection of a particular power condition by a host processor of the storage system.

In one embodiment, a storage system comprises a host processor, a volatile memory associated with the host processor, and a solid-state storage device coupled to the host processor and comprising a non-volatile memory. The host processor is configured to detect a particular power condition and responsive to the detected power condition to direct the copying of data from the volatile memory associated with the host processor to the non-volatile memory of the solid-state storage device. In conjunction with directing the copying of data from the volatile memory associated with the host processor to the non-volatile memory of the solid-state storage device, the host processor further directs the solid-state storage device to enter an enhanced write bandwidth operating mode in which the solid-state storage device temporarily at least partially suspends at least one specified background process that would otherwise tend to restrict an achievable write bandwidth of the solid-state storage device.

The power condition detected in some embodiments comprises a power failure condition such as a loss of AC power.

By way of example, such an arrangement illustratively involves maximizing or otherwise optimizing the write bandwidth of the solid-state storage device during the enhanced write bandwidth mode of operation so as to ensure that the contents of the volatile memory associated with the host processor can be safely transferred to the non-volatile memory of the solid-state storage device within a limited period of time for which a temporary backup power source is available after the power failure.

In other embodiments, the detected power condition that triggers entry of the enhanced write bandwidth mode via the host processor is a power off condition, such as that arising when a user pushes a power off switch. In an example of an arrangement of this type, the use of the enhanced write bandwidth operating mode provides an improved user experience by allowing completion of a system shutdown or hibernation transition in less time than would otherwise be possible.

The specified background process or processes that are fully or partially suspended in the enhanced write mode of operation illustratively include at least one of a thermal throttling process, a wear leveling process, a garbage collection process, a process of scanning for error correction code errors, and a process of enforcing read or write disturb data retention policies. Additional or alternative background processes or combinations of multiple such processes can be used in illustrative embodiments.

These and other illustrative embodiments include, without limitation, apparatus, systems, methods and computer program products comprising processor-readable storage media.

DETAILED DESCRIPTION

Illustrative embodiments of the present invention will be described herein with reference to exemplary information processing systems and associated computers, servers, storage devices and other processing devices. It is to be appreciated, however, that embodiments of the invention are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center that includes one or more clouds hosting multiple tenants that share cloud resources.

Figure 1:
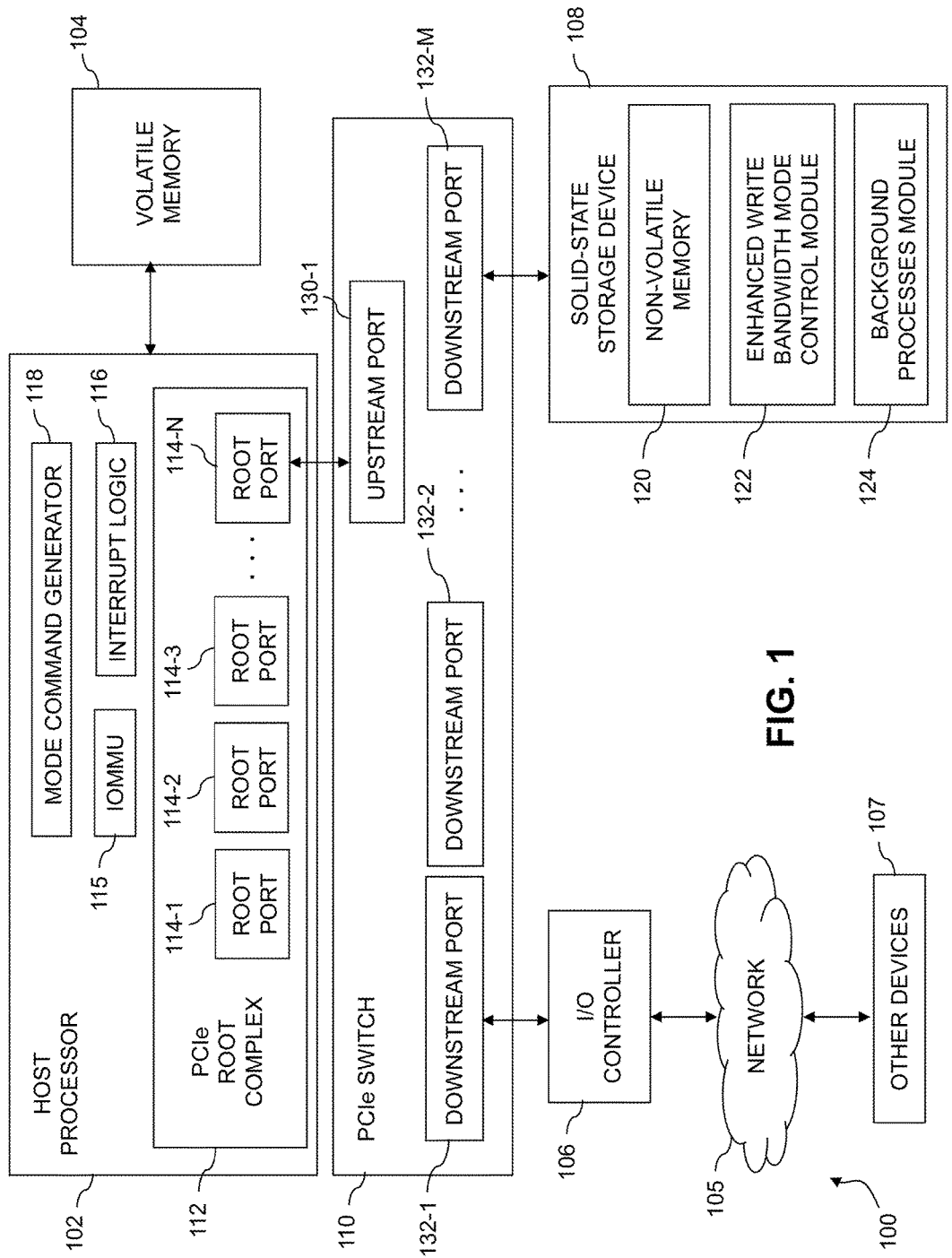
FIG. 1 is a block diagram of an information processing system comprising a storage system configured to implement an enhanced write bandwidth operating mode in a solid-state storage device in an illustrative embodiment.

FIG. 1 shows an information processing system 100 configured in accordance with an illustrative embodiment. The information processing system 100 comprises a storage system that includes a host processor 102, a volatile memory 104 associated with the host processor 102, an input-output (I/O) controller 106, a solid-state storage device 108 and a peripheral component interconnect express (PCIe) switch 110. Although only single instances of these storage system elements are shown in the figure, it is to be appreciated that other embodiments can include multiple instances of each of one or more of the storage system elements 102, 104, 106, 108 and 110. Also, the system 100 may comprise multiple storage systems each having sets of elements 102, 104, 106, 108 and 110.

A network 105 couples the I/O controller 106 to other devices 107 of the information processing system 100 that are not considered part of the storage system. For example, the additional devices may comprise computers, virtual machines, containers or other types of processing devices that generate data within the system 100 for storage in the storage system comprising elements 102, 104, 106, 108 and 110. Also by way of example only, such data generated within the system 100 can be moved between the other devices 107 and the I/O controller 106 using remote direct memory access (RDMA) connections over InfiniBand or Gigabit Ethernet. Numerous other types of connections and associated data transfer protocols can be used in other embodiments.

The I/O controller 106 in some embodiments is configured for connecting to host devices. Additionally or alternatively, the I/O controller 106 can be configured for connecting to other storage devices. As one example, the I/O controller may be implemented in the form of a serial attached SCSI (SAS) controller used to connect to SAS hard disk drives (HDDs), although a wide variety of other types of I/O controllers can be also be used.

It is apparent from the above that the other devices 107 in some embodiments comprise host devices, storage devices, or combinations of these and other devices.

The storage system further comprises a PCIe root complex 112 having a plurality of root ports 114-1, 114-2, 114-3, . . . 114-N. One or more of these root ports 114 are utilized to support communication between the I/O controller 106 and the solid-state storage device 108 via the host processor 102 and PCIe switch 110. In addition to the PCIe root complex 112, the host processor 102 illustratively comprises an I/O memory management unit (IOMMU) 115 and interrupt logic 116. The IOMMU 115 in some embodiments is configured to support virtualization functionality within the system 100.

Also included in the host processor 102 is a mode command generator 118. The mode command generator 118 generates one or more commands for causing the solid-state storage device 108 to enter an enhanced write bandwidth mode of operation, as will be described in more detail below.

Although the volatile memory 104 is shown as separate from the host processor 102 in the FIG. 1 embodiment, in other embodiments the volatile memory 104 may be at least partially incorporated into the host processor 102. Accordingly, a volatile memory associated with a host processor in a given embodiment may comprise an internal volatile memory of the host processor. Numerous other arrangements are possible for volatile memory associated with a given host processor.

The solid-state storage device 108 comprises a non-volatile memory 120, an enhanced write bandwidth mode control module 122 and a background processes module 124.

It is assumed that the volatile memory 104 of the host processor 102 comprises dynamic random access memory (DRAM) and that the non-volatile memory 120 of the solid-state storage device 108 comprises NAND-based flash memory. The use of DRAM in the volatile memory 104 provides the host processor 102 with a very low access times to read and write stored data, typically less than about 20 nanoseconds for both read and write operations. Non-volatile memory such as NAND-based flash memory typically has much higher access times, approximately 150 microseconds for write operations and 30 microseconds for read operations, and is typically only accessible by block access with block size of 512 B or larger.

Although not explicitly shown in the figure, additional components are typically included in the solid-state storage device 108, such as, for example, at least a small amount of volatile memory and a plurality of base address registers (BARs).

The volatile memory of the solid-state storage device 108 is illustratively a type of temporary memory that provides transient storage for data arriving in the solid-state storage device 108 before such data is subsequently persisted in the permanent non-volatile memory 120. The terms "temporary" and "permanent" as used herein are relative terms, and are intended to be broadly construed. Such terms should not be viewed as having any particular respective time periods associated therewith.

The temporary volatile memory in some embodiments may comprise memory implemented in or otherwise associated with a storage controller and utilized only for short-term buffering of data. Numerous other types and arrangements of temporary volatile memory may be used in other embodiments.

The solid-state storage device 108 may comprise a directly-addressable storage device. Such a directly-addressable storage device comprises, for example, a storage device that a host processor or I/O controller can access using PCIe reads and writes. Other types of solid-state storage devices can be used in other embodiments. The term "solid-state storage device" as used herein is therefore intended to be broadly construed.

The solid-state storage device 108 in some embodiments illustratively comprises one or more SSDs, although it should be understood that other types of storage technologies can be used in other embodiments. Also, combinations of multiple distinct types of storage technologies can be used to implement a given solid-state storage device as that term is generally used herein. The temporary volatile memory, if any, of the solid-state storage device 108 illustratively comprises DRAM, and as indicated previously the permanent non-volatile memory 120 illustratively comprises NAND-based flash memory, although other types of memories can be used in other embodiments.

Examples of other non-volatile alternatives to flash memory that may be utilized in a given implementation of the solid-state storage device 108 include resistive RAM, phase change memory, spin torque magnetic RAM (MRAM) and Intel Optane™ devices based on 3D Xpoint memory.

The FIG. 1 embodiment can be configured to implement common storage system operations such as write caching or journaling. For example, in conjunction with such operations, data that has been recently written to the storage system from one or more external hosts is stored in the volatile memory 104.

The PCIe switch 110 in the present embodiment comprises at least one upstream port 130-1. Such an upstream port may have at least one overlay BAR associated therewith. There may be multiple additional upstream ports and respective overlay BARs implemented within the PCIe switch 110 in a given embodiment, but such additional upstream ports and respective overlay BARs are omitted from the figure for simplicity and clarity of illustration. The upstream port 130-1 is shown in the figure as coupled to one of the root ports 114 of the PCIe root complex 112, illustratively root port 114-N.

The PCIe switch 110 further comprises a plurality of downstream ports 132-1, 132-2, . . . 132-M possibly also having respective overlay BARs associated therewith. The I/O controller 106 is coupled to the first downstream port 132-1 and the solid-state storage device 108 is coupled to the final downstream port 132-M. Other I/O controllers, solid-state storage devices or other types of PCIe devices can be coupled to respective other ones of the downstream ports 132.

The particular coupling arrangements of upstream port 130-1 to root port 114-N and downstream ports 132-1 and 132-M to respective I/O controller 106 and solid-state storage device 108 are presented by way of illustrative example only, and numerous alternative coupling arrangements using other combinations of root ports, switch upstream and downstream ports and PCIe devices can be used in other embodiments.

The I/O controller 106 is illustratively configured to transfer received data and associated interrupts as PCIe writes into downstream port 132-1 of PCIe switch 110. The PCIe writes may include separate PCIe writes for data and interrupts. These different types of PCIe writes can be identified by their respective address ranges. For example, a message signaled interrupt or MSI is implemented as a PCIe write to a predefined address range. The host processor 102 interprets PCIe writes to that address range as interrupts. Different processor families typically have different predefined or programmable address ranges for which PCIe writes to those address ranges are interpreted as interrupts rather than data. For example, for Intel Xeon processors, this address range is a 32-bit range given by 0xFEEXXXXX.

In some embodiments, data is received in the I/O controller 106 from one or more of the other devices 107 via the network 105, although data can be received by I/O controller 106 in other ways. The I/O controller 106 generates a plurality of write commands in conjunction with receipt of data to be stored in the storage system. These write commands illustratively comprise respective PCIe writes. A given such PCIe write comprising one or more interrupts illustratively comprises one or more message signaled interrupts (MSIs) and is more particularly referred to herein as an MSI PCIe write.

Although communications between the host processor 102 and the solid-state storage device 108 are illustratively shown as utilizing PCIe connections in the present embodiment, other embodiments can use other types of connections. For example, alternative embodiments can use alternative types of interfaces such as Serial Attached SCSI (SAS) and Serial ATA (SATA). Numerous other interfaces and associated communication protocols can be used in other embodiments.

It is therefore to be appreciated that PCIe switch 110 and PCIe root complex 112 can be entirely eliminated in other embodiments, and the solid-state storage device 108 can be directly connected to the host processor 102.

As mentioned above, the volatile memory 104 illustratively comprises a high-performance memory such as DRAM that can support large I/O bandwidths, and also has a relatively low latency. However, because this memory is volatile, data could be lost, for example, if the storage system were to lose power before the data could be saved to the non-volatile memory 120 of the solid-state storage device 108.

It is assumed that the storage system in the FIG. 1 embodiment illustratively includes one or more different types of temporary power backup (e.g., battery backup) in the event that the storage system power is lost.

As will be described in greater detail below, the solid-state storage device 108 in illustrative embodiments disclosed herein has an enhanced write bandwidth mode of operation that is triggered by detection in the host processor 102 of one or more particular power conditions such as a loss of alternating current (AC) power. Such an enhanced write bandwidth mode of operation allows for more rapid transfer of data from the volatile memory 104 to the non-volatile memory 120, thereby increasing the amount of data that can transferred during a period of temporary power backup. This in turn helps to ensure that data stored in the volatile memory 104 will not be lost as a result of the power condition.

In the present embodiment, it is more particularly assumed that the host processor 102 is configured to detect a particular power condition and responsive to the detected power condition to direct the copying of data from the volatile memory 104 associated with the host processor 102 to the non-volatile memory 120 of the solid-state storage device 108.

Furthermore, in conjunction with directing the copying of data from the volatile memory 104 associated with the host processor 102 to the non-volatile memory 120 of the solid-state storage device 108, the host processor 102 additionally directs the solid-state storage device 108 to enter the above-noted enhanced write bandwidth operating mode of operation. In this mode of operation, the solid-state storage device 108 temporarily at least partially suspends at least one specified background process that would otherwise tend to restrict an achievable write bandwidth of the solid-state storage device 108.

By way of example, the specified background process is temporarily at least partially suspended for a period of time that is greater than or equal to an amount of time required to complete the copying of data from the volatile memory 104 associated with the host processor 102 to the non-volatile memory 120 of the solid-state storage device 108.

The specified background process or processes that are fully or partially suspended in the enhanced write mode of operation illustratively include at least one of a thermal throttling process, a wear leveling process, a garbage collection process, a process of scanning for error correction code errors, and a process of enforcing read or write disturb data retention policies. The processes are assumed to be controlled by the background processes module 124 of the solid-state storage device 108. Additional details regarding these example background processes each of which may be fully or partially suspended in an enhanced write bandwidth mode of operation will be provided below in conjunction with FIG. 2, although it is to be appreciated that alternative or additional background processes of background processes module 124 can be subject to at least partial suspension in other embodiments.

One or more of such background processes are automatically at least partially suspended for a limited period of time by the enhanced write bandwidth mode control module 122 responsive to corresponding commands received from the mode command generator 118. For example, the mode command generator 118 can generate different commands for controlling different ones of the background processes, or can generate a single command that is interpreted by the enhanced write bandwidth mode control module as directing the temporary at least partial suspension of multiple specified background processes.

As a more particular example, the mode command generator 118 of the host processor 102 illustratively generates a single specific command that causes the solid-state storage device 108 to enter the enhanced write bandwidth mode of operation by disabling thermal throttling and possibly one or more other background processes. This specific command is illustratively a "vendor unique command" that is not part of a standard command set that includes standard commands such as read, write and format commands.

In some embodiments, the enhanced write bandwidth operating mode is configured to maximize or otherwise optimize the write bandwidth so as to ensure that the entire contents of the volatile memory 104 can be safely copied into the non-volatile memory 120 in the shortest time possible.

For example, if the solid-state storage device 108 has a maximum achievable write bandwidth of approximately 2 GB/sec but that write bandwidth is reduced in normal operation by execution of one or more background processes, full suspension of the background processes in the enhanced write bandwidth mode of operation can ensure that the maximum write bandwidth of 2 GB/sec is actually achieved for the copying of the contents of the volatile memory 104 to the non-volatile memory 120.

This can ensure that the copying of the contents of the volatile memory 104 is completed within a limited amount of time, which may be constrained by a limited hold-up energy provided from a backup power source.

The solid-state storage device 108 via the enhanced write bandwidth mode control module 122 can provide an acknowledgment back to the host processor 102 indicating that it has completed the copying of the data into the non-volatile memory 120. In conjunction with generation of such an acknowledgement, the enhanced write bandwidth mode control module 122 can reverse the temporary suspension of the one or more background processes such that those processes once again become active.

Although the above-described illustrative embodiments are presented in the context of persisting data from the volatile memory 104 to the non-volatile memory 120 of the solid-state storage device 108, the disclosed techniques are not limited to use in this particular context. The disclosed techniques can therefore also be used in conjunction with other types of movement of data within a storage system. For example, data stored in a volatile memory of one of the other devices 107 may be persisted in the non-volatile memory 120 using an enhanced write bandwidth mode of operation as disclosed herein.

It is to be appreciated that these and other features of illustrative embodiments are presented by way of example only, and should not be construed as limiting in any way.

Accordingly, different numbers, types and arrangements of host processors, processor volatile memories, controllers, switches and solid-state storage devices can be used in other embodiments.

Additional details regarding example process operations associated with an enhanced write bandwidth mode of operation in illustrative embodiments will be provided below in conjunction with the flow diagram of FIG. 2.

The storage system of the FIG. 1 embodiment may be configured to provide at least a portion of at least one storage tier of a multi-tier storage system. For example, the storage system may comprise at least part of a fast tier of a multi-tier storage system. The fast tier is an example of what is more generally referred to herein as a "front-end storage tier" of the multi-tier storage system. As another example, the storage system may comprise at least part of a capacity tier of a multi-tier storage system. The capacity tier is an example of what is more generally referred to herein as a "back-end storage tier" of the multi-tier storage system.

In some embodiments, the fast tier and the capacity tier of the multi-tier storage system are implemented in the form of a 2 TIERS™ storage system from EMC Corporation of Hopkinton, Mass.

By way of example, a given 2 TIERS™ storage system may comprise fast tier implemented using DSSD™ server-based flash storage devices, also from EMC Corporation, and capacity tier comprising an object store. In such an arrangement, an I/O dispatcher software layer of the 2 TIERS™ storage system may be configured, for example, to pre-fetch data from the object store of the capacity tier into the DSSD™ storage devices of the fast tier, as well as to support other types of data movement.

A wide variety of other types of server-based flash storage devices and multi-tier storage systems can be used in other embodiments, as will be apparent to those skilled in the art. References herein to DSSD™ storage devices and the 2 TIERS™ storage system are by way of example only.

It is also possible that the storage system of the FIG. 1 embodiment may be part of a single-tier storage system. For example, it may be combined with additional similar systems or components in forming such a single-tier storage system.

A given storage tier of one of the types described above may comprise one or more object stores, including cloud-based object stores such as Amazon Simple Storage Service (S3), GCP Cloud Storage, and Microsoft Azure Blob Storage. Accordingly, cloud-based implementations of the FIG. 1 storage system are possible.

The particular storage drives used in a given storage tier may be varied depending on the particular needs of a given embodiment, and multiple distinct storage drive types may be used within a single storage tier. The term "storage drive" as used herein is intended to be broadly construed, so as to encompass, for example, disk drives, flash drives, solid-state drives, hybrid drives or other types of storage products and devices.

As another example, the storage system may be used to implement at least a portion of at least one storage node in a cluster file system. Such a cluster file system may comprise a parallel file system, a distributed file system or combinations of multiple file systems of potentially different types.

The storage system of FIG. 1 may be part of a larger storage platform. For example, such a storage platform can comprise any of a variety of different types of storage including network-attached storage (NAS), storage area networks (SANs), direct-attached storage (DAS) and distributed DAS, as well as combinations of these and other storage types, including software-defined storage.

A given storage platform may comprise storage arrays such as VNX® and Symmetrix VMAX® storage arrays, both commercially available from EMC Corporation. Other types of storage products that can be used in implementing a given storage platform in an illustrative embodiment include software-defined storage products such as ScaleIO™ and ViPR®, and server-based flash storage devices such as DSSD™, as well as cloud storage products such as Elastic Cloud Storage (ECS), object-based storage products such as Atmos, scale-out all-flash storage arrays such as XtremIO™, and scale-out NAS clusters comprising Isilon® platform nodes and associated accelerators in the S-Series, X-Series and NL-Series product lines, all from EMC Corporation. Combinations of multiple ones of these and other storage products can also be used in implementing a given storage platform in an illustrative embodiment.

These and other storage platforms can be part of what is more generally referred to herein as a processing platform comprising one or more processing devices each comprising a processor coupled to a memory. A given such processing device may correspond to one or more virtual machines or other types of virtualization infrastructure such as Docker containers or other types of Linux containers (LXCs). By way of example, one or more of the other devices 107, as well as other system components, may be implemented at least in part using processing devices of such processing platforms.

As indicated above, communications between elements of system 100 may take place over one or more networks.

These networks can illustratively include, for example, a global computer network such as the Internet, a wide area network (WAN), a local area network (LAN), a satellite network, a telephone or cable network, a cellular network, a wireless network implemented using a wireless protocol such as WiFi or WiMAX, or various portions or combinations of these and other types of communication networks.

As a more particular example, some embodiments may utilize one or more high-speed local networks in which associated processing devices communicate with one another utilizing PCIe cards of those devices, and networking protocols such as InfiniBand, Gigabit Ethernet or Fibre Channel. Numerous alternative networking arrangements are possible in a given embodiment, as will be appreciated by those skilled in the art.

Again, it should be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

The operation of the information processing system 100 will now be described in further detail with reference to the flow diagram of FIG. 2. The process as shown includes steps 200 through 206, and is suitable for use in the system 100 but is more generally applicable to other types of systems comprising host processors, host processor volatile memories, switches and solid-state storage devices.

Figure 2:
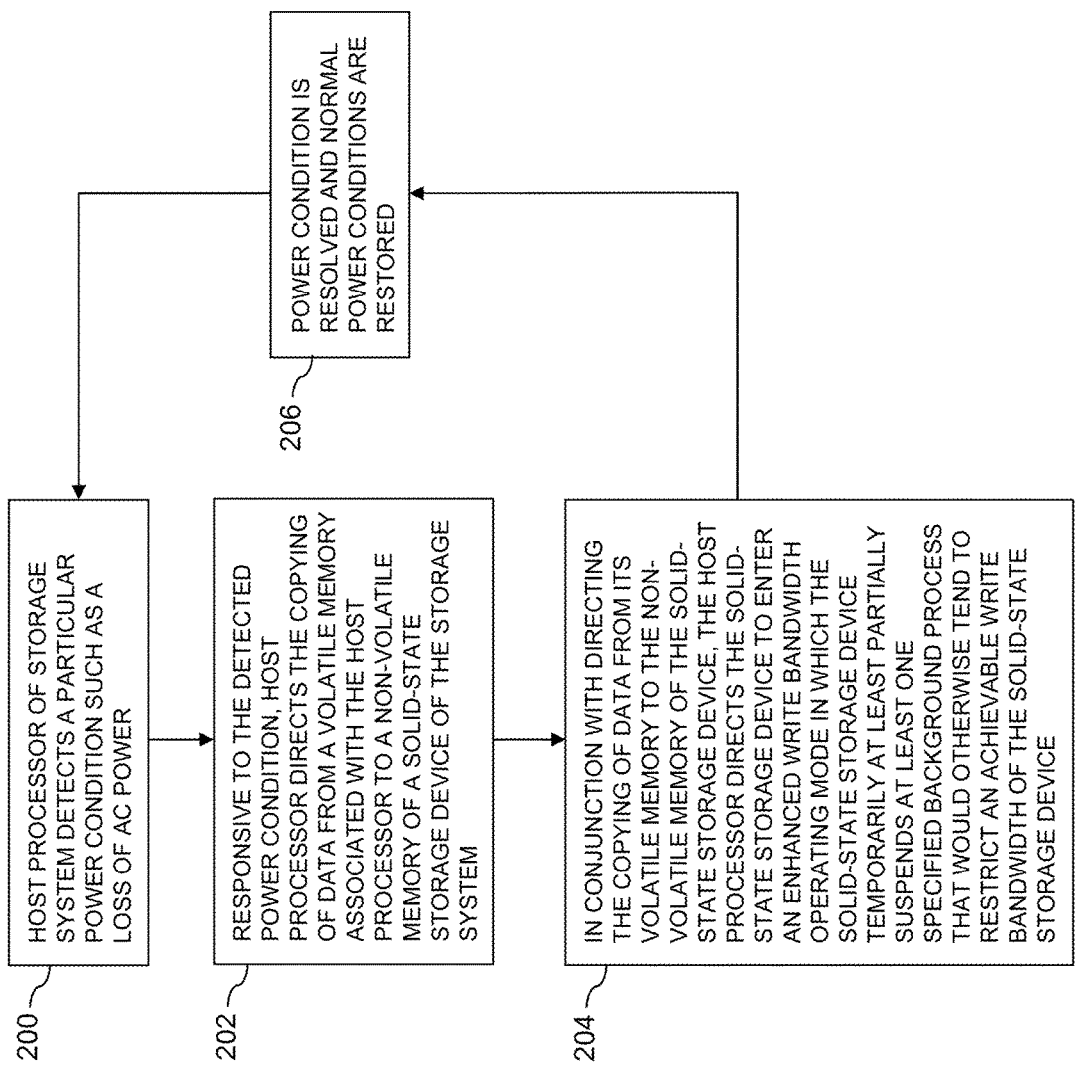
FIG. 2 is a flow diagram of an enhanced write bandwidth process implemented in the storage system of FIG. 1.

The particular process as illustrated in FIG. 2 represents one example of an enhanced write bandwidth process that may be implemented in the system 100, although it is to be appreciated that numerous other types of enhanced write bandwidth processes may be implemented in the system 100 in other embodiments.

In step 200, a power condition is detected in a host processor of a storage system. For example, the power condition in some embodiments is a loss of AC power from a power failure in a facility where the storage system is located. This may be a main power supply failure or similar condition that forces the storage system to be powered off standby power for a limited amount of time. Other types of power conditions relating to power failures or other situations can be detected in step 200.

With reference to the FIG. 1 embodiment, the host processor 102 may detect the power condition via an alert received from another system component such as a backup power supply that is triggered by an AC line failure. Such an alert may be in the form of an interrupt that is processed by the interrupt logic 116 of the host processor 102, although other types of signaling could be used.

As a more particular example, the storage system 100 may be powered by AC power that is backed up by a standby power supply (SPS). When AC power is lost, the SPS switches to battery backup immediately. The SPS illustratively has a serial communication path to a server or other host device comprising the host processor 102. The host processor 102 can therefore detect the loss of AC power by detecting receipt of particular alert or other signal from the SPS. Other techniques can be used to allow the host processor 102 to detect the loss of AC power within the storage system 100.

In some embodiments, the power condition detected in step 200 does not relate to a power failure, but instead relates to a power off condition arising, for example, due to a user pressing a power off switch. Such a power condition can generate an alert that is processed by the interrupt logic 116 of the host processor 102. Power off conditions are considered examples of "power conditions" that are detectable by a host processor, as the term is broadly used herein.

In step 202, responsive to the detected power condition, the host processor directs the copying of data from a volatile memory associated with the host processor to a non-volatile memory of a solid-state storage device of the storage system.

For example, the host processor 102 in the FIG. 1 embodiment illustratively directs the copying of data stored in the volatile memory 104 to the non-volatile memory 120 of the solid-state storage device 108.

It should be noted that the term "copying" as used in this context is intended to be broadly construed, so as to encompass various types of transfer of data from the volatile memory 104 to the non-volatile memory 120.

The host processor 102 in directing the copying of data from the volatile memory 104 associated with the host processor 102 to the non-volatile memory 120 of the solid-state storage device 108 generates one or more PCIe commands, although it is to be appreciated that other types of commands can be used in other embodiments.

In some embodiments, large amounts of data need to be copied from the volatile memory 104 to the non-volatile memory 120 of the solid-state storage device 108. For example, a server or other host device having two CPU sockets each with 512 GB of volatile cache memory will have over 1 TB of data to copy. Such multiple-CPU arrangements are collectively considered a type of "host processor" as that term is broadly used herein.

The host processor 102 in directing the copying of data from the volatile memory 104 to the non-volatile memory 120 of the solid-state storage device 108 directs that such copying occur in a sequential manner utilizing a particular input-output block size selected to increase data transfer efficiency by reducing processing overhead. For example, the data transfer efficiency can be increased in some embodiments by utilizing a large input-output block size of 128 KB instead of a more typical input-output block size of 4 KB or 8 KB. Other types of data transfer efficiencies can be implemented based on block size selection without necessarily utilizing sequential input-output processing.

It should be noted that contents of any temporary volatile memory of the solid-state storage device 108 may also be copied to the non-volatile memory 120 of the solid-state storage device 108 in conjunction with the copying of data from the volatile memory 104 to the non-volatile memory 120. Such additional copying is also assumed to be responsive to detection of the loss of AC power in the storage system 100.

In step 204, in conjunction with directing the copying of data from the volatile memory associated with the host processor to the non-volatile memory of the solid-state storage device, the host processor directs the solid-state storage device to enter an enhanced write bandwidth operating mode in which the solid-state storage device temporarily at least partially suspends at least one specified background process that would otherwise tend to restrict an achievable write bandwidth of the solid-state storage device.

This is achieved in the FIG. 1 embodiment by utilizing the mode command generator 118 of the host processor 102 to provide one or more commands to the enhanced write bandwidth mode control module 122 of the solid-state storage device 108. Such a command or set of commands are illustratively delivered from the host processor 102 via the root port 114-N of the PCIe root complex 112 through the upstream port 130-1 and the downstream port 132-M to the solid-state storage device 108.

The specified background process or processes are in some embodiments temporarily at least partially suspended for a period of time that is greater than or equal to an amount of time required to complete the copying of data from the volatile memory 104 associated with the host processor 102 to the non-volatile memory 120 of the solid-state storage device 108.

As one example, the specified background process that is temporarily at least partially suspended by the solid-state storage device 108 in the enhanced write bandwidth operating mode comprises a thermal throttling process in which the solid-state storage device 108 reduces the achievable write bandwidth if a monitored temperature of the solid-state storage device 108 is above a designated threshold.

The thermal throttling process in a given solid-state storage device is illustratively utilized to ensure the long term reliability of the device components such as the retention capability of its NAND-based flash by reducing the write bandwidth in order to limit the higher power draw and associated temperature increase that typically occurs during write operations. Accordingly, the thermal throttling process slows down the write operations and reduces the write bandwidth to limit the temperature of the solid-state storage device.

Illustrative embodiments temporarily disable this thermal throttling process by signaling the solid-state storage device via a vendor unique command or other type of command to enter the enhanced write bandwidth mode of operation. This exposes the solid-state storage device to an increased workload and potentially higher temperature for a short period of time required to copy the contents of the volatile memory 104 to the non-volatile memory 120. Typically this period of time will last only a few seconds to a few minutes and will be a rare event during the lifetime of the solid-state storage device. After the copy operation the solid-state storage device will return to its normal mode or modes of operation and the brief disabling of the thermal throttling process will result in little or no negative effects on long term reliability.

As another example, the specified background process that is temporarily at least partially suspended by the solid-state storage device 108 in the enhanced write bandwidth operating mode comprises a wear leveling process in which data writes are distributed in an even pattern over portions of the non-volatile memory 120 in order to prevent uneven utilization of those portions of the non-volatile memory 120.

A solid-state storage device comprising NAND-based flash typically utilizes a flash translation layer (FTL) in order to abstract the NAND hardware layer from the host device operating system and the associated file system. This allows the device firmware to distribute the writes from the operating system to the NAND-based flash in an even manner so as to guarantee that the NAND-based flash is not exposed to early failures while maintaining a map of what data is no longer valid in a given memory block. However, such a wear leveling process limits the achievable write bandwidth by utilizing some portion of the available write bandwidth for internal data movement.

As a further example, the specified background process that is temporarily at least partially suspended by the solid-state storage device 108 in the enhanced write bandwidth operating mode comprises a garbage collection process in which portions of the non-volatile memory 120 previously used for writing of data are identified as available memory space for writing of new data. Such a garbage collection process may be partially suspended subject to a requirement that a minimum amount of available memory space be maintained within the solid-state storage device 108 sufficient to complete the copying of data from the volatile memory 104. This will ensure that there is enough free space within the solid-state storage device 108 to accommodate the data that is to be copied from the volatile memory 104.

As yet another example, the specified background process that is temporarily at least partially suspended by the solid-state storage device 108 in the enhanced write bandwidth operating mode comprises a process of scanning for error correction code errors in at least a portion of the non-volatile memory 120. A solid-state storage device with NAND-based flash will typically implement such a process to periodically scan for error correction code errors and the process can reduce the achievable write bandwidth. Suspending the process for the limited period of time required to copy the contents of the volatile memory 104 to the non-volatile memory 120 of the solid-state storage device 108 can increase the write bandwidth without undermining the normal operation of the device.

As a final example, the specified background process that is temporarily at least partially suspended by the solid-state storage device 108 in the enhanced write bandwidth operating mode comprises a process of enforcing read or write disturb data retention policies in at least a portion of the non-volatile memory 120. A process of this type is ordinarily used to enforce NAND-based flash read or write disturb data retention policies that have reached a given threshold and can be temporarily suspended during the enhanced write bandwidth mode of operation without undermining the normal operation of the device.

Various combinations of the above examples of specified background processes may be subject to full or partial suspension within the enhanced write bandwidth mode of operation.

Accordingly, the solid-state storage device 108 in the enhanced write bandwidth operating mode may temporarily completely suspend multiple specified background processes that would otherwise tend to restrict an achievable write bandwidth of the solid-state storage device. This can include a subset of the example background processes described above, or additional or alternative background processes. Also, different ones of the multiple background processes can be suspended for different periods of time or otherwise controlled in different ways subject to different conditions, parameters or features that are unique to the particular background process being controlled.

As mentioned previously, the solid-state storage device 108 can provide an acknowledgment back to the host processor 102 indicating that it has completed the copying of the data into the non-volatile memory 120. In conjunction with generation of such an acknowledgement, the enhanced write bandwidth mode control module 122 can cause the background processes module 124 to resume the normal operation of the various background processes that had previously been fully or partially suspended.

In step 206, the power condition is resolved and normal power conditions are restored. The process then returns to step 200 in order to allow the host processor to continue to monitor for occurrence of additional instances of the particular power condition or conditions. During such monitoring, the solid-state storage device operates in accordance with its normal mode or modes of operation.

As noted above, the detected power condition in some embodiments is a power off condition rather than a power failure condition. In one possible example of an arrangement involving detection of a power off condition, the enhanced write bandwidth operating mode provides an improved user experience by allowing completion of a system shutdown or hibernation transition in less time than would otherwise be possible.

It is assumed in some embodiments that power failures or other power conditions that trigger entry of the solid-state storage device 108 into its enhanced write bandwidth mode of operation can occur at any arbitrary time. It is further assumed that in its normal operating mode or modes the solid-state storage device 108 is used as a generic storage device with primarily random access patterns of mixed read and write operations. These particular assumptions need not apply in other embodiments.

The particular processing operations and other system functionality described in conjunction with the flow diagram of FIG. 2 are presented by way of illustrative example only, and should not be construed as limiting the scope of the invention in any way. Alternative embodiments can use other types of processing operations involving a host processor, host processor volatile memory, switch and solid-state storage device. For example, the ordering of the process steps may be varied in other embodiments, or certain steps may be performed concurrently with one another rather than serially. Also, one or more of the process steps may be repeated periodically, or multiple instances of the process can be performed in parallel with one another in order to process data from different volatile memories possibly associated with different host processors for storage within different solid-state storage devices of a storage system comprising multiple such components.

It is to be appreciated that functionality such as that described in conjunction with the flow diagram of FIG. 2 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Illustrative embodiments disclosed herein can provide a number of significant advantages relative to conventional arrangements.

For example, one or more embodiments provide an efficient mechanism for causing a solid-state storage device to enter an enhanced write bandwidth operating mode that facilitates persisting of data from a host processor volatile memory into non-volatile memory of the solid-state storage device.

Such arrangements can be used to advantageously maximize or otherwise optimize the available write bandwidth in the event of a power failure of other detected power condition so as to ensure that the entire contents of the volatile memory can be stored in the non-volatile memory within a limited amount of time.

In some embodiments, a host processor detects a loss of power in the storage system and directs a solid-state storage device to enter the enhanced write bandwidth operating mode while also maximizing or otherwise optimizing the block size used to copy data from its volatile memory into the non-volatile memory of the solid-state storage device.

In other embodiments, a host processor detects a power off condition such as that initiated by a user pushing a power off switch and directs a solid-state storage device to enter the enhanced write bandwidth mode in order to allow a transition to a system shutdown or hibernation to occur in less time than would otherwise be possible.

It is to be appreciated that the particular advantages described above are associated with particular illustrative embodiments and need not be present in other embodiments. Also, the particular types of information processing system features and functionality as illustrated in the drawings and described above are exemplary only, and numerous other arrangements may be used in other embodiments.

It was noted above that portions of an information processing system as disclosed herein may be implemented using one or more processing platforms. Illustrative embodiments of such platforms will now be described in greater detail. These and other processing platforms may be used to implement at least portions of other information processing systems in other embodiments of the invention. A given such processing platform comprises at least one processing device comprising a processor coupled to a memory.

One illustrative embodiment of a processing platform that may be used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as virtual machines, or portions thereof, are illustratively implemented for use by tenants of such a multi-tenant environment.

Cloud infrastructure as disclosed herein can include cloud-based systems such as AWS, GCP and Microsoft Azure. Virtual machines provided in such systems can be used to implement a fast tier or other front-end tier of a multi-tier storage system in illustrative embodiments. A capacity tier or other back-end tier of such a multi-tier storage system can be implemented using one or more object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of LXC. The containers may run on virtual machines in a multi-tenant environment, although other arrangements are possible. The containers may be utilized to implement a variety of different types of functionality within the system 100. For example, containers can be used to implement respective compute nodes or storage nodes of a cloud-based system. Again, containers may be used in combination with other virtualization infrastructure such as virtual machines implemented using a hypervisor.

Another illustrative embodiment of a processing platform that may be used to implement at least a portion of an information processing system comprises a plurality of processing devices which communicate with one another over at least one network. The network may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

Each processing device of the processing platform comprises a processor coupled to a memory. The processor may comprise a microprocessor, a microcontroller, an application-specific integrated circuit (ASIC), a field-programmable gate array (FPGA) or other type of processing circuitry, as well as portions or combinations of such circuitry elements. The memory may comprise random access memory (RAM), read-only memory (ROM) or other types of memory, in any combination. The memory and other memories disclosed herein should be viewed as illustrative examples of what are more generally referred to as "processor-readable storage media" storing executable program code of one or more software programs.

Articles of manufacture comprising such processor-readable storage media are considered embodiments of the present invention. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals.

Also included in the processing device is network interface circuitry, which is used to interface the processing device with the network and other system components, and may comprise conventional transceivers.

As another example, portions of a given processing platform in some embodiments can comprise converged infrastructure such as VxRail™, VxRack™ or Vblock® converged infrastructure commercially available from VCE, the Virtual Computing Environment Company, an EMC Federation Company.

Again, these particular processing platforms are presented by way of example only, and other embodiments may include additional or alternative processing platforms, as well as numerous distinct processing platforms in any combination, with each such platform comprising one or more computers, servers, storage devices or other processing devices.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in an information processing system as disclosed herein. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality of host processor 102, I/O controller 106, solid-state storage device 108 and PCIe switch 110 are illustratively implemented in the form of software running on one or more processing devices.

It should again be emphasized that the above-described embodiments of the invention are presented for purposes of illustration only. Many variations and other alternative embodiments may be used. For example, the disclosed techniques are applicable to a wide variety of other types of information processing systems, utilizing other arrangements of storage systems, processors, memories, controllers, switches, solid-state storage devices and other components. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A storage system comprising:
a host processor;
a volatile memory associated with the host processor;
a solid-state storage device coupled to the host processor and comprising a non-volatile memory;
wherein the host processor is configured to detect a particular power condition and responsive to the detected power condition to direct the copying of data from the volatile memory associated with the host processor to the non-volatile memory of the solid-state storage device;
wherein in conjunction with directing the copying of data from the volatile memory associated with the host processor to the non-volatile memory of the solid-state storage device, the host processor further directs the solid-state storage device to enter an enhanced write bandwidth operating mode in which the solid-state storage device temporarily at least partially suspends at least one specified background process that would otherwise tend to restrict an achievable write bandwidth of the solid-state storage device; and
wherein the host processor in directing the copying of data from the volatile memory associated with the host processor to the non-volatile memory of the solid-state storage device directs that such copying occur utilizing a particular input-output block size selected to increase data transfer efficiency by reducing processing overhead.

2. The storage system of claim 1 wherein the power condition comprises one of a power failure condition and a power off condition.

3. The storage system of claim 1 further comprising a PCIe switch having an upstream port coupled to a given one of a plurality of root ports of a PCIe root complex of the host processor and a downstream port coupled to the solid-state storage device.

4. The storage system of claim 1 wherein the host processor in directing the copying of data from the volatile memory associated with the host processor to the non-volatile memory of the solid-state storage device generates one or more commands.

5. The storage system of claim 1 wherein the specified background process is temporarily at least partially suspended for a period of time that is greater than or equal to an amount of time required to complete the copying of data from the volatile memory associated with the host processor to the non-volatile memory of the solid-state storage device.

6. The storage system of claim 1 wherein the specified background process that is temporarily at least partially suspended by the solid-state storage device in the enhanced write bandwidth operating mode comprises a thermal throttling process in which the solid-state storage device reduces the achievable write bandwidth if a monitored temperature of the solid-state storage device is above a designated threshold.

7. The storage system of claim 1 wherein the specified background process that is temporarily at least partially suspended by the solid-state storage device in the enhanced write bandwidth operating mode comprises a wear leveling process in which data writes are distributed in an even pattern over portions of the non-volatile memory in order to prevent uneven utilization of those portions of the non-volatile memory.

8. The storage system of claim 1 wherein the specified background process that is temporarily at least partially suspended by the solid-state storage device in the enhanced write bandwidth operating mode comprises a garbage collection process in which portions of the non-volatile memory previously used for writing of data are identified as available memory space for writing of new data.

9. The storage system of claim 8 wherein the garbage collection process is partially suspended subject to a requirement that a minimum amount of available memory space be maintained within the solid-state storage device.

10. The storage system of claim 1 wherein the specified background process that is temporarily at least partially suspended by the solid-state storage device in the enhanced write bandwidth operating mode comprises a process of scanning for error correction code errors in at least a portion of the non-volatile memory.

11. The storage system of claim 1 wherein the specified background process that is temporarily at least partially suspended by the solid-state storage device in the enhanced write bandwidth operating mode comprises a process of enforcing read or write disturb data retention policies in at least a portion of the non-volatile memory.

12. The storage system of claim 1 wherein the solid-state storage device in the enhanced write bandwidth operating mode temporarily completely suspends multiple specified background processes that would otherwise tend to restrict an achievable write bandwidth of the solid-state storage device.

13. The storage system of claim 1 wherein the solid-state storage device provides an acknowledgment to the host processor indicating that it has completed the copying of the data into the non-volatile memory.

14. A method comprising:
detecting a particular power condition in a host processor of a storage system;
responsive to the detected power condition, directing the copying of data from a volatile memory associated with the host processor to a non-volatile memory of a solid-state storage device of the storage system; and
in conjunction with directing the copying of data from the volatile memory associated with the host processor to the non-volatile memory of the solid-state storage device, directing the solid-state storage device to enter an enhanced write bandwidth operating mode in which the solid-state storage device temporarily at least partially suspends at least one specified background process that would otherwise tend to restrict an achievable write bandwidth of the solid-state storage device;
wherein directing the copying of data from the volatile memory associated with the host processor to the non-volatile memory of the solid-state storage device comprises directing that such copying occur utilizing a particular input-output block size selected to increase data transfer efficiency by reducing processing overhead.

15. The method of claim 14 wherein the specified background process is temporarily at least partially suspended for a period of time that is greater than or equal to an amount of time required to complete the copying of data from the volatile memory associated with the host processor to the non-volatile memory of the solid-state storage device.

16. The method of claim 14 wherein the specified background process that is temporarily at least partially suspended by the solid-state storage device in the enhanced write bandwidth operating mode comprises a thermal throttling process in which the solid-state storage device reduces the achievable write bandwidth if a monitored temperature of the solid-state storage device is above a designated threshold.

17. A computer program product comprising a non-transitory processor-readable storage medium having stored therein program code of one or more software programs, wherein the program code, when executed by a storage system comprising a host processor, a volatile memory associated with the host processor, and a solid-state storage device comprising a non-volatile memory, causes the storage system:
to detect a particular power condition in the host processor;
responsive to the detected power condition, to direct the copying of data from the volatile memory associated with the host processor to the non-volatile memory of the solid-state storage device; and
in conjunction with directing the copying of data from the volatile memory associated with the host processor to the non-volatile memory of the solid-state storage device, to direct the solid-state storage device to enter an enhanced write bandwidth operating mode in which the solid-state storage device temporarily at least partially suspends at least one specified background process that would otherwise tend to restrict an achievable write bandwidth of the solid-state storage device;
wherein directing the copying of data from the volatile memory associated with the host processor to the non-volatile memory of the solid-state storage device comprises directing that such copying occur utilizing a particular input-output block size selected to increase data transfer efficiency by reducing processing overhead.

18. The computer program product of claim 17 wherein the specified background process is temporarily at least partially suspended for a period of time that is greater than or equal to an amount of time required to complete the copying of data from the volatile memory associated with the host processor to the non-volatile memory of the solid-state storage device.

19. The computer program product of claim 17 wherein the specified background process that is temporarily at least partially suspended by the solid-state storage device in the enhanced write bandwidth operating mode comprises a thermal throttling process in which the solid-state storage device reduces the achievable write bandwidth if a monitored temperature of the solid-state storage device is above a designated threshold.

20. The apparatus of claim 1 wherein the particular input-output block size is selected to increase data transfer efficiency in the enhanced write bandwidth operating mode and comprises an integer multiple of a smaller input-output block size normally utilized outside of the enhanced write bandwidth operating mode.

* * * * *